United States Patent [19]

Kraus et al.

[11] 4,055,948

[45] Nov. 1, 1977

[54] SOLAR THERMAL-RADIATION, ABSORPTION AND CONVERSION SYSTEM

[76] Inventors: Robert A. Kraus; Edmund J. Kraus, both of 14160 Redhill, Tustin, Calif. 92680

[21] Appl. No.: 638,927

[22] Filed: Dec. 8, 1975

[51] Int. Cl.$^2$ .................... F03G 7/02; F24J 3/02
[52] U.S. Cl. ........................... 60/641; 60/655; 126/270; 126/271
[58] Field of Search ............. 126/270, 271; 60/641, 60/655

[56] References Cited

U.S. PATENT DOCUMENTS

| 659,450 | 10/1900 | McHenry | 60/641 |
| 2,460,482 | 2/1949 | Abbot | 60/271 |
| 3,107,052 | 10/1963 | Garrison | 126/271 X |
| 3,908,632 | 9/1975 | Poulsen | 126/271 |

Primary Examiner—Allen M. Ostrager

[57] ABSTRACT

The invention described herein is a Method and Process for the direct absorption of radiant solar-thermal energy by and within a radiant-heat absorbing fluid.

More specifically, however, it is a total system for the direct absorption of radiant solar-thermal energy and its conversion, for the purpose of generating useful mechanical or electrical power. Wherein within the scope of the total system, a radiant-heat absorbing fluidic compound is used which comprises minute particles of colloidal size, suspended within a transparent heat-transfer fluid, having a high boiling point and being circulated within a first highly light-transparent and a second highly light-reflecting wall.

Wherein that fluidic compound's optical density is such that incoming concentrated, radiant solar-thermal energy, after penetrating said light-transparent wall, will penetrate no more than one and three-quarters depth of said contained, circulating fluidic compound.

5 Claims, 4 Drawing Figures

FIG. 4

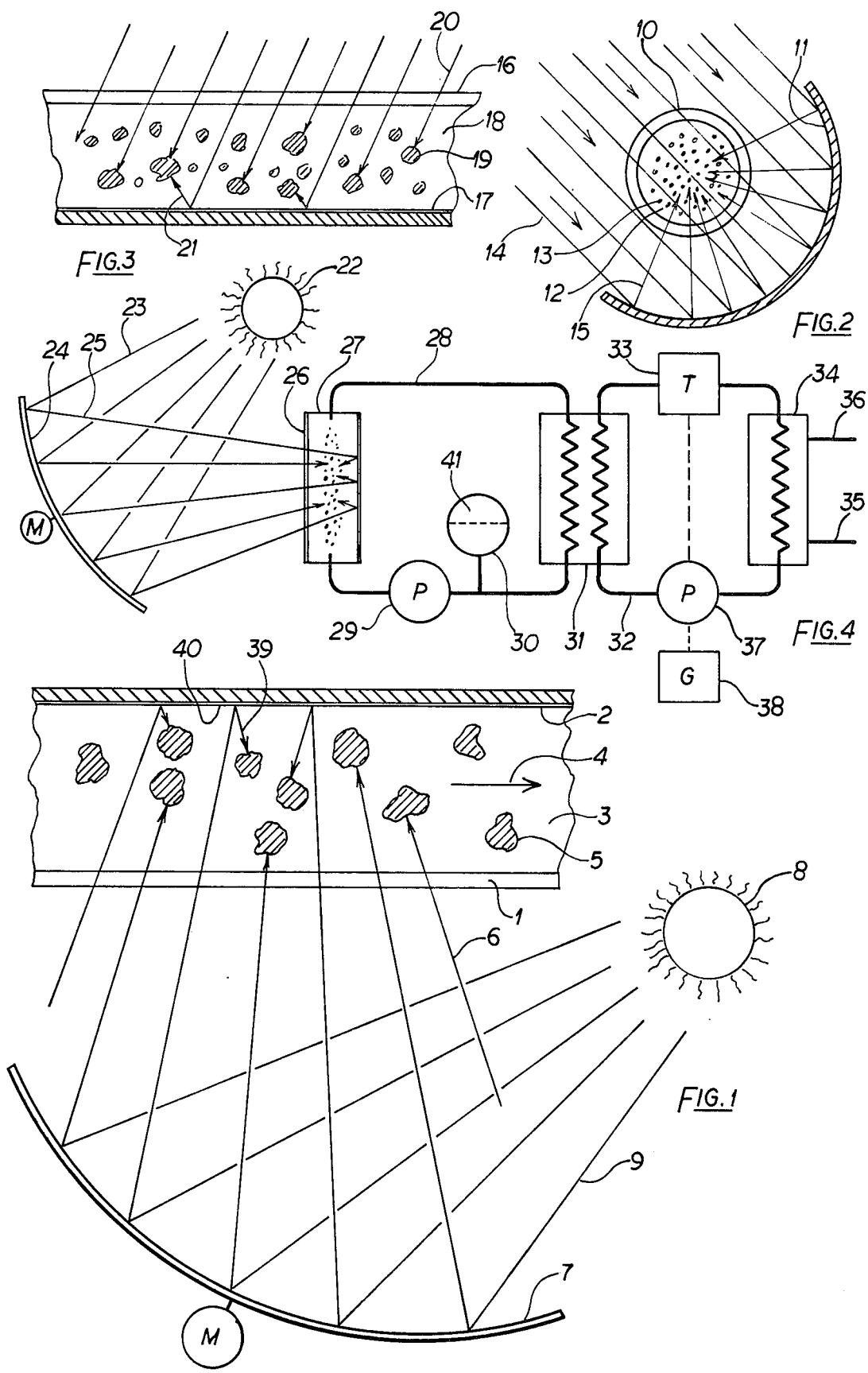

4,055,948

SOLAR THERMAL-RADIATION, ABSORPTION AND CONVERSION SYSTEM

FIELD OF THE INVENTION

In its preferred embodiment, the invention herein is a solar-thermal power plant, utilizing muliple arrays of sun-tracking mirror heliostats to focus incoming solar-thermal radiative energy through a highly light-transparent radiation receiving fluid containment shell located on top of a tall central tower, thereby causing the heating of a radiant-heat absorbing fluidic compound circulated within, through only one one basic, basic thermodynamic heat transfer process; namely, that of radiation acting directly between the sun and the heat-transfer fluid to be heated.

THE STATE OF THE PRIOR ART

The state of the prior art provides a number of devices, or systems, designed for the collection of solar-thermal radiant energy, most of which are based, in their construction, on flat, metallic, radiant-heat collector plates comprising a dull-black, non-reflecting outer surface, directly and perpendicularly exposed to the sun's radiation, and comprising a series of internal fluid passages through which a suitable heat-transfer fluid is circulated for the evacuation of the collected thermal energy to be used, either locally or at some remote location. Others are constructed of black glass, but operate basically as the devices constructed from conventional materials.

The typical construction features of the devices in the prior art are only discussed briefly, particularly since only the kind and numbers of the basic thermodynamic heat-transfer processes involved, from the sun's emission of thermal radiation, to the system's heat-transfer fluid's rise in temperature and the actual implementation thereof represent the essence between the devices of the prior art and that of our own invention. Anyone skilled in the art of designing such devices could easily implement the same once the basic conceptional philosophy of the operation for our device is established, which is the object of the patent application herein.

The basic and essential differences in the conceptional philosophy and operational procedures between the devices of the prior art and that of our own invention can best be found in the difference between the kind and numbers of the basic thermodynamic heat-transfer processes involved to accomplish the heating of the system's heat-transfer fluid for further conversion into useful power and in the differences in which the conceptional ideas are implemented, respectively.

The total scope of the power-producing scheme, for either a device of the prior art or that of our own invention, encompasses and involves two stages of thermodynamic energy conversion. One deals with the conversion of radiant heat, from the sun's emission, to the temperature rise of either system's heat-transfer fluid. The other deals with the actual conversion of said captured thermal energy into useful power.

The letter the latter conversion, from the thermal energy contained within the heat-transfer fluid to the conversion into power, proceeds for both the systems of the prior art and that of our own invention, more or less in a conventional way.

Considered to be extremely inportant within the total scope of the power-producing scheme, the latter conversion is conversion is mentioned herein as an appendix to complete the total concept for a system to produce power.

The essence of our invention deals with the first conversion, from the sun's emission, to the heat-transfer fluid's temperature rise and the means for the implementation thereof.

The Conceptional Differences of the Prior Art

The essential differences between the devices of the prior art and that of our own invention are set apart by three different conceptional philosophies.

The first crucial and essential differences come to light through the analysis of the basic thermodynamic heat-transfer processes involved to raise their respective system's heat-transfer fluid's temperature.

The second crucial and essential differences between the respective systems involve the physical implementation for the heat-transfer, from the sun's thermal emission, to the rise in temperature of the respective system's heat-transfer fluid.

And, third, there is a definite difference in the kind of heat-transfer fluid used in the systems of the prior art and that of our own invention.

In analysis of the respective system's first crucial and essential differences, the devices of the prior art, because of their construction, involve all three basic thermodynamic heat-transfer processes known:

First, the involvement of the basic heat-transfer process of radiation, which constitutes the thermodynaic transfer link, betweem the sun's surface and the sun-exposed outer surface of the system's collector plates, to raise the collector plate's outer surface temperature by means of direct radiation.

Second, follows the involvement of the basic heat-transfer process of conduction, which transfers the collected thermal energy from that collector plate's unexposed outer surface, at elevated temperature, to that plate's inner surface at a substantially lower temperature.

And, third, the involvement of the basic heat-transfer process of convection, which, in turn, transfers the thermal energy from the collector plate's inner surface to the heat-transfer fluid circulating within, at still lower temperature.

Whereas, by comparison, the system of our own invention involves only one basic heat-transfer process; namely, the process of radiation, emitted by the sum, being received directly by and within the system's heat-transfer fluid.

The advantages of a system such as that of our own invention can immediately be seen and recognized by anyone knowledgeable in the science of thermodynamics.

The analysis of the respective system's second crucial and essential differences show the thermal collector plates of the prior art being physically constructed from a non-light-transparent material since in those devices only the sunexposed, dull-black, non-reflecting outer surface is stricken by the incoming solar-thermal radiant energy. Whereas, in the device of our own invention, the sun's incoming rays pass directly through the system's glass-like light-transparent fluid containment wall and the contained transparent heat-transfer fluid within to strike the minute, non-reflecting particles of colloidal size, homogenously suspended within that heat-transfer fluid, thereby transferring that incoming thermal radiant energy to the fluid suspended particles directly from within.

And, finally, the third crucial and essential difference between the two respective systems can be recognized in that the systems of the prior art do not specify a definite optical density of their system's heat-transfer fluid as being critical. In fact, the heat-transfer fluid used in the devices of the prior art could be almost any fluid, from ordinary water to certain chemical compounds having a boiling point higher, or even lower, than that of water.

Whereas, the heat-transfer fluid for the system of our own invention is formulated to conform strictly to a specific optical density suitable for the design of the transparent fluid containment shell within the total scope of a solar power-producing plant.

Furthermore, the heat-transfer fluid used in the systems of the prior art could be from perfectly clear to any color in the visible spectrum of light.

Whereas, the heat-transfer fluid in a system of our own invention comprises minute, dull-black, non-light-reflecting particles of colloidal size being suspended within a clear heat-transfer fluid as a carrier media and being arranged in their quantitative magnitude so that the sun's radiant flux can penetrate the heat-transfer fluid through a distance of no more than one and three-quarters fluid depth between a first highly light-transparent and a second highly light-reflecting fluid containment wall.

OBJECT OF OUR INVENTION

It is, therefore, an object of our invention to provide a new and novel means for the collection of vast amounts of highly concentrated solar-thermal radiant energy at extraordinary temperatures necessary for the efficient operation of modern steam turbines.

A further object of our invention is to provide a new and novel means to eliminate the heat-transfer time through the system's fluid containment shell, which normally acts as a thermal insulating interface between the solar-radiant energy and the contained heat-transfer fluid.

A still further object of our invention is to simplify the total system's operational concept, thereby lessening the system's inherent initial construction cost.

And a still further object of our invention is the capability to provide a vapor, power-producing plant, preferably of the Rankin type, with a vapor having the necessary high temperatures for an efficient turbine operation.

Another object is the utilization of concentrated sunlight for the inexpensive production of electrical power.

Still another object of our invention is to provide a fast thermal conversion rate from the highly focused and concentrated solar-thermal radiant energy to the absorption of that energy from within the system's circulating heat-transfer fluid.

These and other objects of our invention become apparent through the following detailed specifications and appended drawings.

BRIEF DESCRIPTION OF THE DRAWING

FIG. 1 shows the basic construction of the device in its preferred embodiment, showing some of the solid particles of colloidal size being suspended within the heat-transfer fluid, illustrated as a highly magnified enlargement, and incoming solar-thermal radiation striking these particles for the conversion of its energy.

FIG. 2 shows an alternate embodiment of the device, also including its heat-transfer fluid.

FIG. 3 shows a device for the collection of direct incoming solar-thermal radiant energy through a highly light-transparent fluid containment shell, or radiation receiver, and partial reflection of said radiant energy from the opposing highly light-reflecting wall and the relation of the fluid's optical density to the transparent fluid's total depth, and the absorption of reflected energy by the suspended particles of colloidal size.

FIG. 4 shows a typical block diagram of the pressurized closed fluid circuit of the preferred embodiment, in combination with a standard Rankin vapor power-producing plant.

NUMERICAL DESCRIPTION OF THE DRAWINGS

FIG. 1 shows a section of the highly light-transparent fluid containment wall 1 of the solar-thermal receiver 2 and 3, respectively, and 2 represents the opposing highly light-reflecting wall thereof. 3 is the transparent heat-transfer fluid circulated through the fluid containment in direction of the arrow 4. 5 are the minute particles of colloidal size, suspended within the transparent heat-transfer transfer fluid 3. 6 represents the incoming solar-thermal radiation reflected by the sun-tracking mirror heliostat 7. 8 is the sun and 9 is the sun's radiation not yet reflected by either one or an entire array of the mirror heliostats 7.

FIG. 2 shows a cross-section perpendicular to the cylinder axis of an alternate design, using a light-transparent boiler tube 10 suspended at the axial center of an concentrically arranged half cylindrical sunlight reflecting mirror 11 and the internally circulated heat-transfer fluid 12, also comprising minute particles of colloidal size 13. 14 are direct incoming or heliostat-reflected radiations emitted by the sun and 15 are those rays directed and concentrated through the transparent boiler tube 10 and the circulating fluidic heat-transfer compound 12.

FIG. 3 shows a perpendicular sectional view of a flat solar-thermal receiver, wherein 16 is the first light-transparent containment wall. 17 represents the light-reflecting wall thereof. 18 is the transparent heat-transfer fluid and 19 are the minute fluid suspended particles of colloidal size. 20 are incoming thermal radiations directly striking the suspended particles of colloidal size and 21 is part of the incoming solar-thermal radiation reflected by that second light-reflecting wall, striking these suspended particles from the opposing direction to convert radiant into thermal energy within the fluidic compound.

FIG. 4 shows a block diagram of a solar thermal electric power plant of our own invention, illustrating in detail the typical components of a total scheme necessary for the production of electrical power.

Wherein, 22 is the sun emitting thermal radiation 23 which strikes the sun-tracking mirror heliostat 24 to reflect and direct concentrated solar-thermal radiation 25 through the transparent containment wall 26 of the solar-thermal receiver 27. Included is also a fluid circulating loop 28 and pump 29, fluidic pressurization tank 30, pressurization gas 41 and the boiler heat exchanger 31, part of which is an integral part of the connected Rankin heat vapor power cycle 32, comprising a vapor turbine 33, condenser heat exchanger 34, having a cooling water inlet 35 and cooling water outlet 36, the boiler feed pump 37 and the electrical generator 38.

OPERATIONAL CONCEPT OF THIS INVENTION

FIG. 1 shows the scheme for the production of concentrated solar-thermal energy, providing for either one or an entire field of sun-tracking mirror heliostats 7 to focus the incoming solar-thermal radiant energy 9 and 6 respectively, toward and through the radiation receiver's light-transparent fluid containment shell 1 constructed of a highly heat-resisting and tempered glass-like material, such as "Pyrex" or "Quartz". Other exotic glass-like materials are also available to be used for said purpose.

The radiation receiver containment shell may either be flat or cylindrical in construction, as illustrated in FIG. 1 and FIG. 2 respectively. The method of trapping the concentrated solar-thermal radiation for the heating of the system's heat-transfer fluid is based on the fact that the highly concentrated sun-emitted thermal radiation is allowed to be transmitted through the system's first transparent fluid containment wall 2 and 10 respectively.

Upon penetration of that first transparent fluid containment wall, the concentrated solar-thermal radiation passes almost freely through the transparent heat-transfer fluid 3, heating it slightly. On the way through that transparent heat-transfer fluid 3, the concentrated penetrating rays 6 will ultimately strike either all or the greater portion of these minute, dull-black, non-reflecting particles of colloidal size 5, typically between approximately 200 and 500 angstrom in dimension. The smaller portion of the rays which have managed to penetrate through the heat-transfer fluid's entire depth without striking any of that fluid's suspended particles 5 is reflected by that light-reflecting second containment wall 40 to strike that fluid's suspended particles 5 from the opposing direction, leaving all of the incoming rays' initial energy stored in form of heat within that circulating heat-transfer fluid 3, which heat transfer fluid must be looked upon as a homogeneous fluidic media, in combination with its suspended particles, characterized by its ability to absorb almost all the incoming radiant energy from within. The system's heat-transfer fluid 3 could also be a fluid having an inherent high thermal boiling point, comprising a suitable dye or pigments, or a similar substance with a non-light-reflecting characteristic and the ability to resist and absorb radiant-thermal energy after its penetration through that radiation receiver's transparent fluid containment wall 1. The quantitative magnitude of the heat-transfer fluid's suspended particles 5 conforms to the radiant flux per unit solid angle, per unit area, projected through the radiation receiver's transparent fluid containment wall 1 times a unit depth of the radiation absorbing fluid. That is to say that the total sum of that fluid's suspended particles, as seen perpendicular to and through that light-transparent wall 1, per unit projected area, contains at least a quantitative equivalent amount of suspended particles of colloidal size to equal the quantitative magnitude of the radiant flux penetrating the system's transparent fluid containment wall 1.

Wherein the fluidic compound's optical density per given containment depth between the containment's first light-transparent and its second light-reflecting wall is considered to be 100 percent, if the total radiant flux penetrating the system's light-transparent containment shell 1 at a solid angle, per unit area, is absorbed by a sufficient quantitative magnitude of suspended solid particles of colloidal size within that fluid 3, so that only a fraction of one percent of the penetrating rays 6 will actually strike and reflect from that containment shell's second reflecting wall 2 to strike some of those suspended solid particles 5 from the opposing direction.

That is to say that if more of the penetrating rays 6 are reflected from that containment shell's second light-reflecting wall 2, the fluidic compound's optical density is less, and more if no rays at all will strike that second light-reflecting wall 2. In any case, a total absorption of the penetrating rays 6 can be achieved even if that optical density is such that the radiant energy's optimum flux penetration depth through that fluidic compound equals one and three-quarters of the distance between that first light-transparent and that second light-reflecting wall 1 and 2, respectively.

Thus, the importance in the relation between that light-transparent fluid containment wall 1, the optical density and the radiation absorbing quality of the circulated heat-transfer compound 3, as well as the reflective properties of that second light-reflecting wall 2 as a total entity, and part of the total scheme to produce electrical energy from the sun's emitted radiation can readily be seen. Wherein no temperature difference is necessary to transfer thermal energy between the outer and the inner surface of the fluid containment wall 1 through the basic heat-transfer process of conduction and, from there, via the basic heat-transfer process of convection to the circulating heat-transfer fluid, at lower temperature within.

From the foregoing, it becomes evident that the circulating heat-transfer fluidic compound can be exposed to temperatures of extraordinary magnitudes directly from within when concentrated sunlight is focused through the system's transparent fluid containment radiation receiver.

To prevent that circulating heat-transfer fluidic compound from flushing instantaneously into either steam or vapor when exposed to such extraordinarily high temperatures, as can be achieved through the focusing and concentrating of solar-thermal radiant energy, the entire primary heating loop 28 (FIG. 4) is pressurized statically by an inert gas 41 within the closed system's expansion tank 30 at a substantially higher pressure than that of the corresponding temperature-pressure for that specific heat-transfer fluid at that achieved temperature.

After absorption of the concentrated thermal radiation 6, the heated heat-transfer compound is pumped under pressure via the system's closed primary fluidic circulation loop 28 through the heat-exchanger boiler 31, wherein the accummulated heat is transferred to the fluid vapor media of the secondary coupled heat vapor power cycle 32 of the Rankin type, for conversion into electrical power by the turbine 33 and coupled electrical generator 38. Upon removal of the heat-transfer fluid's thermal energy within the system's heat-exchanger boiler 31, that cooled heat-transfer fluid of the primary cycle 28 is introduced to the system's radiation receiver to be re-heated and to begin a new cycle wherein the heat-transfer fluid is circulated in its liquid state.

The secondary heat vapor power cycle, however, utilizes the principle of a Rankin cycle engine, comprising the introduction of water by pump 37 to boiler pressure into the system's heat-exchanger boiler 31, whereupon evaporation, adiabatic expansion takes place within the steam turbine 33, to condenser pressure and condensation to the initial point within the secondary system's turbine condenser 34 to begin a new cycle of that secondary system's fluid vapor media. During condensation of the secondary system's heated vapor, cooling water is pumped through the secondary system's turbine condenser 34, entering at inlet 35 to exit at outlet 36.

FIG. 2 shows an alternate device of our invention, illustrating a light-transparent boiler tube 10 and a half cylindrical light-reflecting mirror 11 from a view perpendicular to their common axis, wherein incoming solar-thermal radiative energy 14 is focused by an array of sun-tracking mirror heliostats or through direct incoming radiation and penetrated through that transparent boiler tube 10 by rays 15, striking the non-light-reflecting particles of colloidal size 13 suspended within the heat-transfer fluid 12, thereby heating that heat-transfer fluid which is circulated through the transparent boiler tube in a fashion as described in FIG. 1.

FIG. 3 shows still another alternate arrangement wherein the light-transparent first fluid containment wall 16 and the second light-reflecting wall 17, plus the particles 19 of colloidal size suspended within said heat-transfer fluid 18 is subject to direct radiation from the sun, in a flat arrangement, shown substantially perpendicular to the entering and reflecting rays 20 and 21 respectively.

It should be noted that the device in FIG. 3 is an individual device not dependent on the reflection of a multiple array of sun-tracking mirror heliostats, but its operation functions best if the entire system in FIG. 3 is pointed at all times directly toward the sun. It should also be noted that the system in FIG. 3 is not suited for extraordinarily high temperatures, as encountered in the device in FIG. 1 and FIG. 2.

During actual construction of a scaled-down model of the device, it has been proven that the philosophy and operational concept is sound and physically demonstrable.

The foregoing is considered as illustrative only of the principle of the invention. Further, since numerous modifications and changes will readily occur to those skilled in the art, it is not desired to limit the invention to the exact construction and operation shown and described. Accordingly, all suitable modifications and equivalents falling within the scope of the invention may be resorted to.

What is claimed to as new is as follows:

1. A highly light-transparent radiant heat-receiving fluid containment constructed of a hard and high-temperature-resisting glass-like material having at least one first highly light-transparent wall and one second highly light-reflecting wall, being spaced substantially apart from each other to form a fluid passage between them
    and being exposed substantially perpendicular to direct or indirect and focused thermal radiant emission from the sun,
comprising a temperature-inert, thermal radiation-absorbing fluidic heat-transfer compound of a certain desired optical density, having a high boiling point and comprising a quantitative magnitude of solid, dull-black, non-light-reflecting particles of colloidal size, per unit area, times a certain unit fluid depth to compliment said fluidic compound's desired optical density and being homogeneously suspended within said heat-transfer fluid, circulating through said transparent radiation receiver containment
    to be heated directly from within through the basic heat-transfer process of radiation,
wherein the thermal radiation emitted from the sun penetrates through said transparent radiation receiver containment to strike those particles of colloidal size suspended homogeneously within said circulating, radiant heat-absorbing, heat-transfer fluid, partially direct and partially by means of reflection from said second light-reflecting wall
    for the purpose of heating that radiant heat-absorbing fluid and to evacuate said absorbed and stored radiant heat within said fluidic compound for further conversion into either mechanical or electrical power, or for the purpose of general heating, domestic and industrial.

2. A device as in claim 1, wherein said heat-transfer fluidic compound is circulating under pressure within said highly light-transparent, radiant heat receiver containment to absorb and collect either direct incoming or reflected and concentrated radiant thermal energy emitted by the sun
    for further conversion into either mechanical or electrical power or to be used in general heating, domestic or in industrial process heating and wherein that radiant heat-absorbing and circulating fluidic heat-transfer compound possesses a certain desired optical density and comprises a certain quantitative magnitude of minute, dull-black, non-light-reflecting particles, consisting of a colloid of tiny particles, typically and approximately between 100 and 500 angstroms in dimension and being homogeneously suspended within said heat-transfer fluid as a carrier media,
    formulated in their quantitative magnitude relative to their carrier fluid to establish a desired optical density thereof,
wherein said specific optical density is such that the penetration depth of the incoming thermal radiant flux, at a solid angle of projection, is no more than one and three-quarters of the fluidic compound's total depth at its lowest usable density.

3. A fluidic compound as in claim 1 comprising a nonlight-reflecting radiant heat-absorbing dye or any other substance of equally usable characteristics
    which, by virtue of its applied quantity to its carrier fluid, can change said fluidic compound's optical density and thereby its radiant heat-absorption characteristics to any desired level at will.

4. A device as claimed in claim 1 comprising either a tubular or a cylindrical, highly light-transparent, thermal radiation receiver containment constructed of a hard shock and temperature-resisting glass-like material,
    having a half cylindrical, highly light-reflecting mirror spaced substantially from, and concentrically arranged around, said light-transparent fluid containment's axial center
so that either direct incoming thermal radiation emitted from the sun or the sun's concentrated radiant energy reflected by a series of sun-tracking mirror heliostats, radiated from a direction substantially opposite to that of said mirror's reflecting and curved inner surface, can be guided by said curved mirror through said radiant heat-receiver's highly light-transparent containment wall, to be
    focused directly therethrough an into said circulating, radiant heat-absorbing fluidic heat-transfer compound, to be heated directly from within by the basic heat-transfer process of radiation;

wherein the radiant heat-absorbing heat-transfer fluidic compound circulating therethrough is pressurized and possesses a definite desired optical density which is formulated so that the incoming radiant flux penetration through said fluidic radiant heat-absorbing compound is not greater than one inside diameter of either said tubular or said cylindrical highly light-transparent fluid containment.

5. A device as claimed in claim 1 wherein the thermal radiant energy absorbed and stored within said radiant heat-absorbing fluidic heat-transfer compound is evacuated from the highly light-transparent, thermal radiation receiver; fluid containment by said fluidic heat-transfer compound circulated, pressurized, through a primary closed fluid circulation system wherein that primary closed circulation system comprises a circulating pump, said highly light-transparent thermal radiant energy-absorbing fluid containment, a boiler heat-exchanger having at least one separate and independent fluid inlet and one separate and independent fluid or vapor outlet, and a fluid pressurization tank within said circulation system for the purpose of transferring the absorbed and stored radiant energy within that fluidic thermal radiation-absorbing compound from the primary system's closed circulation system, via the included boiler heat-exchanger, to a secondary closed fluid vapor power cycle of the Rankin type for further conversion into either mechanical or electrical power, and wherein, said secondary closed heat vapor power cycle of the Rankin type comprises a composite steam plant cycle comprising the introduction of water by pump to boiler pressure within that boiler heat-exchanger, evaporation, adiabatic expansion to condenser pressure within a steam turbine expander to produce power and condensation within a condenser to initial state.

* * * * *